(12) United States Patent
Kwan et al.

(10) Patent No.: US 8,085,860 B2
(45) Date of Patent: Dec. 27, 2011

(54) SYSTEMS AND METHODS FOR SAMPLING FREQUENCY OFFSET ESTIMATION

(75) Inventors: Man Wai Kwan, Shatin (HK); Man Lung Ng, Shatin (HK); Michael Su, Walnut Creek, CA (US); Tao Li, Shatin (HK)

(73) Assignee: Hong Kong Applied Science and Technology Research Institute Co., Ltd., Hong Kong (CN)

( * ) Notice: Subject to any disclaimer, the term of this patent is extended or adjusted under 35 U.S.C. 154(b) by 902 days.

(21) Appl. No.: 12/111,779

(22) Filed: Apr. 29, 2008

(65) Prior Publication Data

US 2009/0268829 A1  Oct. 29, 2009

(51) Int. Cl.
H04K 1/10 (2006.01)
(52) U.S. Cl. .................. 375/260; 370/208
(58) Field of Classification Search .......... 375/260; 370/208
See application file for complete search history.

(56) References Cited

U.S. PATENT DOCUMENTS

| | | | |
|---|---|---|---|
| 5,608,764 A | 3/1997 | Sugita et al. | |
| 7,177,374 B2 * | 2/2007 | Gaikwad et al. | 375/331 |
| 7,224,666 B2 * | 5/2007 | Gummadi et al. | 370/203 |
| 7,711,029 B2 * | 5/2010 | Guey | 375/133 |
| 7,738,357 B2 * | 6/2010 | Gaikwald et al. | 370/208 |
| 7,778,337 B2 * | 8/2010 | Tong et al. | 375/260 |
| 2003/0072254 A1 * | 4/2003 | Ma et al. | 370/208 |
| 2004/0109508 A1 * | 6/2004 | Jeon et al. | 375/260 |
| 2004/0131012 A1 | 7/2004 | Mody et al. | |
| 2005/0084025 A1 * | 4/2005 | Chen | 375/260 |
| 2006/0034227 A1 * | 2/2006 | Mudulodu et al. | 370/334 |
| 2006/0039515 A1 | 2/2006 | Lee et al. | |
| 2006/0176802 A1 * | 8/2006 | Ko et al. | 370/208 |
| 2007/0041312 A1 * | 2/2007 | Kim | 370/208 |
| 2007/0053462 A1 * | 3/2007 | Pirooz et al. | 375/285 |
| 2007/0286062 A1 * | 12/2007 | Gupta | 370/203 |
| 2008/0232504 A1 * | 9/2008 | Ma et al. | 375/267 |
| 2009/0213948 A1 * | 8/2009 | Ma et al. | 375/260 |
| 2009/0268709 A1 * | 10/2009 | Yu | 370/350 |

FOREIGN PATENT DOCUMENTS

EP      1694018 A1 *  8/2006

OTHER PUBLICATIONS

Sands, N. P. et al, Pilotless Timing Recovery for Baseband Multicarrier Modulation, IEEE Journal on Selected Areas in Communications, Jun. 2002, pp. 1047-1054, vol. 20, No. 5, IEEE.

Sliskovic, M., Sampling Frequency Offset Estimation and Correction in OFDM Systems, IEEE, 2001, pp. 437-440.

Speth, M. et al., Optimum Receiver Design for OFDM-Based Broadband Transmission—Part II: A Case Study, IEEE Transactions on Communications, Apr. 2001, pp. 571-578, vol. 49, No. 4, IEEE.

Tsai, P. et al., Joint Weighted Least Squares Estimation of Frequency and Timing Offset for OFDM Systems over Fading Channels, IEEE, 2003, pp. 2543-2547.

Yang, B. et al., An Improved Combined Symbol and Sampling Clock Synchronization Method for OFDM Systems, IEEE, 1999, pp. 1153-1157.

* cited by examiner

Primary Examiner — Juan A Torres
(74) Attorney, Agent, or Firm — Fulbright & Jaworski L.L.P.

(57) ABSTRACT

A method comprises receiving a transmission including at least two Orthogonal Frequency Division Multiplexing (OFDM) symbols, estimating a sampling frequency offset associated with the OFDM symbols at least in part by employing a term representing a density of pilots in the OFDM symbols, and compensating for the sampling frequency offset using the estimated sampling frequency offset.

20 Claims, 6 Drawing Sheets

SYSTEMS AND METHODS FOR SAMPLING FREQUENCY OFFSET ESTIMATION

TECHNICAL FIELD

The present description relates, in general, to digital multi-carrier modulation and, more specifically, to estimating sampling frequency offset in multi-carrier modulation schemes.

BACKGROUND OF THE INVENTION

Orthogonal Frequency Division Multiplexing (OFDM) is one technique for multi-carrier digital modulation. OFDM is currently very popular and finding use in a wide variety of applications, including cellular communications, wireless networks, broadcasting, and the like.

In typical OFDM systems, a transmitter sends data at a certain rate, $f_{Tx}$. Similarly, a receiver samples the transmitted data at a certain rate, $f_{Rx}$. Ideally, the transmitter and receiver are accurately synchronized, thereby assuring that the frequencies of the sub-carriers remain orthogonal. Should the sub-carriers deviate in frequency such that orthogonality is lost, the system can experience cross-talk between the sub-carriers, otherwise known as Inter-Carrier Interference (ICI).

However, in real-world systems, some amount of frequency mismatch (also referred to as sampling frequency offset or "SFO") is expected. Sources of frequency mismatch include, e.g., frequency offset between the transmitter and receiver oscillators and the Doppler shift from movement and multi-path fading. In order to correct for SFO, many systems measure SFO during transmission and perform functions, such as resampling, based on the measured SFO. However, currently available OFDM systems typically have some amount of error in SFO estimations, especially if fast time varying channels are considered. Currently there is no solution available that can decrease the SFO error in fast time varying channels while adding little extra complexity to existing systems.

BRIEF SUMMARY OF THE INVENTION

Various embodiments of the present invention are directed to systems, methods, and computer program products which decrease error in SFO estimations by applying a weighting technique to pilots, based at least in part on pilot density. "Pilot density," as used in the description below, is factor which is proportional to the number of pilot sub-carriers which are used for SFO estimation in a specific frequency region. In other words, pilot density describes a distribution of pilots in the frequency domain. We have observed that, in fast time varying channels, the errors for each of the individual SFO estimates obtained by the neighboring pilot sub-carriers are correlated. The correlation depends on the pilot separation. If the pilot sub-carriers are non-uniformly distributed in the frequency domain, the correlation of the SFO estimates obtained by any two pilot sub-carriers may be different. No prior art SFO estimation algorithms consider this correlation. Hence, the function for combining the SFO estimates given by each pilot sub-carrier always assumes that the SFO error given by each pilot sub-carrier is independent, at least for prior art systems. In fact, due to the correlation, the error in high pilot density portions tends to have a large contribution to the final SFO estimate. This unexpected correlation affects the estimation accuracy of the final SFO estimate obtained by each OFDM symbol. Based on this correlation effect, various embodiments of the invention apply less weight to the SFO estimations of pilots in dense portions to ameliorate the affect that the dense pilot area has on an estimation of SFO for the symbol over the range of sub-carrier indices.

According to one embodiment, a system includes circuitry (e.g., a processor) that estimates an SFO associated with an OFDM symbol at least in part by employing a term which is a function of the density of the used pilots in the OFDM symbol. By applying the term to produce appropriate weighting, the estimate of SFO in the OFDM symbol may show lower SFO estimation error than in prior art systems. Various embodiments use the improved SFO estimate to correct for SFO.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
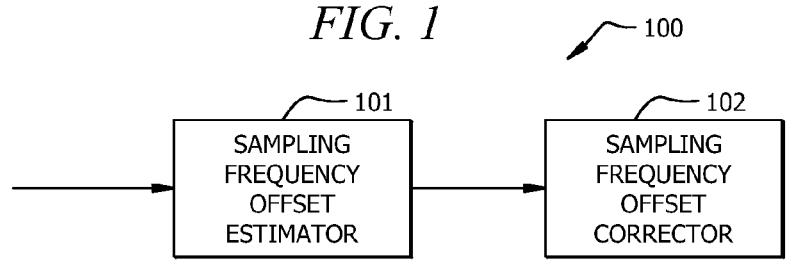
FIG. 1 is an illustration of an exemplary system adapted according to one embodiment of the invention.

FIG. 1 is an illustration of exemplary system 100 adapted according to one embodiment of the invention. System 100 includes circuitry, such as sampling frequency offset estimator 101 and sampling frequency offset corrector 102. Sampling frequency offset estimator 101 estimates a sampling frequency offset (SFO) of one or more received OFDM symbols. Sampling frequency offset estimator 101 can receive any kind of information regarding pilot symbols, including, for example, the symbols themselves, extracted pilots, or information derived from the pilots. Sampling frequency offset estimator 101 employs an algorithm to estimate the SFO using the information regarding the pilot symbols. Specifically, as explained in more detail below, sampling frequency offset estimator 101 takes into account the density of pilots when calculating SFO for a given sub-carrier or symbol.

Sampling frequency offset estimator 101 then outputs the estimate to sampling frequency offset corrector 102. Sampling frequency offset corrector 102 uses the estimate to correct for SFO in a subsequently-received OFDM symbol. In some embodiments, sampling frequency offset corrector 102 uses the estimate unmodified under the assumption that the subsequently received symbols will have the same or similar SFO, and in other embodiments, sampling frequency offset corrector 102 modifies the offset. Various embodiments of the invention are not limited by any specific technique to correct for SFO. While shown as two pieces of circuitry, system 100 is provided for conceptual purposes and is exemplary, rather than limiting. In some embodiments, system 100 can include one, two, or more than two discrete pieces.

Figure 2:
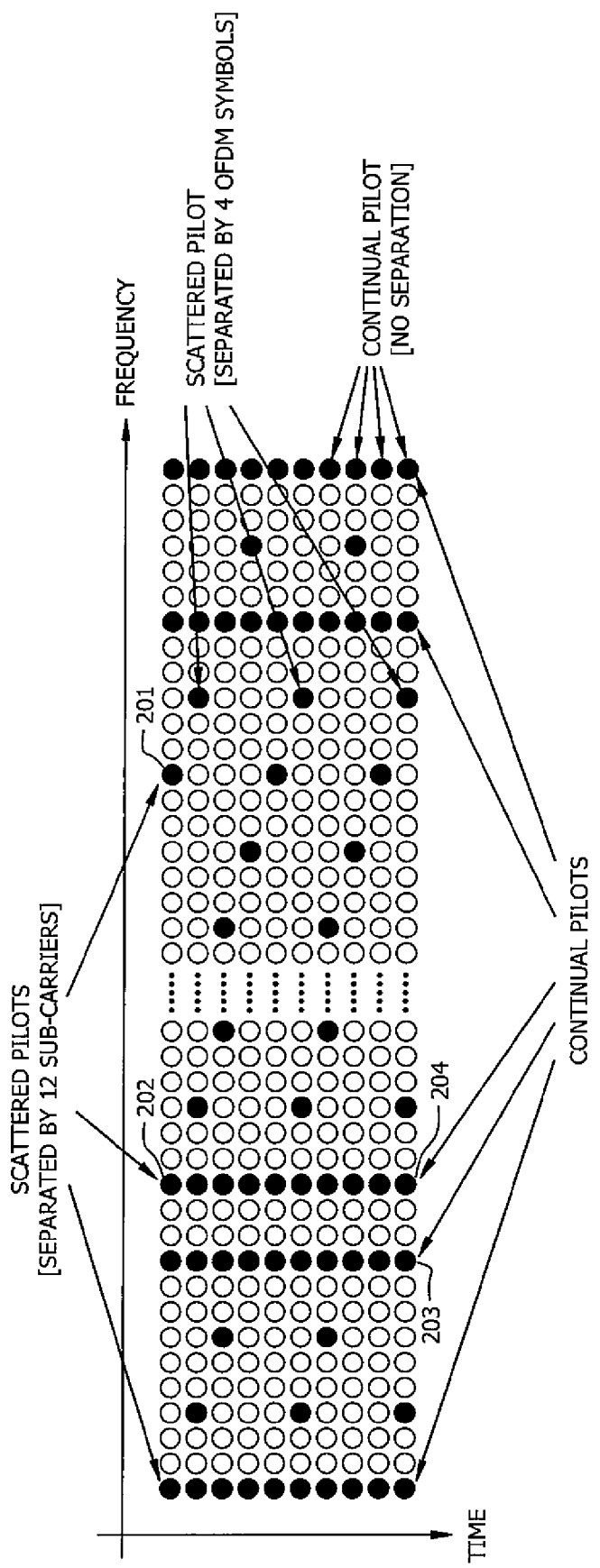
FIG. 2 is an illustration of an exemplary prior art OFDM pilot structure in use in the DVB-H standard, a pilot structure for which various embodiments may be adapted for use.

Various embodiments of the invention can be applied in prior art OFDM systems by enhancing the capabilities of OFDM receivers, even without changing the way symbols are transmitted in prior art systems. FIG. 2 is an illustration of an exemplary prior art OFDM pilot structure in use in the Digital Video Broadcasting-Handheld (DVB-H) standard, a pilot structure for which various embodiments may be adapted for use.

In FIG. 2, the pilot structure includes both scattered and continual pilots, labeled accordingly. Scattered pilots, such as pilots 201 and 202, are arranged in patterns wherein the next pilot in the pattern is separated from the previous pilot in the pattern by a sub-carrier or symbol. Continual pilots, such as pilots 203 and 204, are arranged in patterns such that successive and previous pilots are adjacent and the pilot sub-carriers in the frequency domain are non-uniformly allocated based on a fixed pseudo-random sequence defined in the DVB-H standard. In FIG. 2, pilot 202 is in both a continual pattern and a scattered pattern. It should be noted, though, that various embodiments of the invention are not limited to use in DVB-H systems, as some embodiments can be adapted to accommodate any of a variety of pilot structures now known or later developed.

Pilot-based SFO estimation algorithms generally utilize the characteristic that the SFO causes a proportional amount of phase drift in each sub-carrier across time. Assuming that the channel is time invariant, the phase drift can be obtained based on the phase difference of any particular pilot sub-carriers in two OFDM symbols. For scattered pilots, each pilot is separated by four OFDM symbols which is larger than the channel coherence time in the high Doppler frequency cases specified in the IEC 62002 requirement. This means that if scattered pilots are used in those high Doppler frequency cases, the time invariant channel assumption cannot be fulfilled. However, continual pilots are transmitted in every OFDM symbol, so that the pilot separation is shorter than the coherence time. Hence, continual pilots can be a good candidate for SFO estimation. Nevertheless, we found that the non-uniform frequency domain distribution in the continual pilot sub-carriers results in the uneven correlation problem in the SFO estimate error given by each pilot. Various embodiments of our invention provide a way to reduce impact of this correlation effect to the final SFO estimate.

In simplistic terms, normalized SFO is expressed as the difference between the sampling frequency of the respective transmitter and the frequency of the respective receiver, divided by the frequency of the respective receiver. The relationship is also shown in Equation 1.

$$\varepsilon = \frac{f_{Rx} - f_{Tx}}{f_{Rx}} \tag{1}$$

Figure 3:
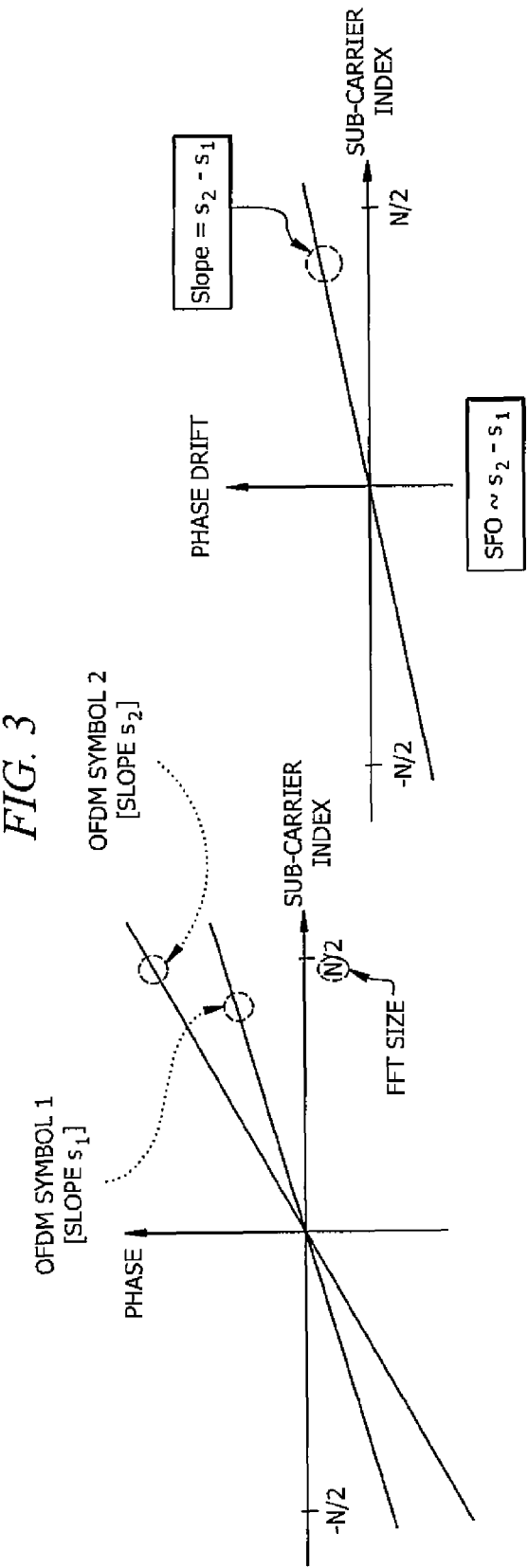
FIG. 3 is an illustration of SFO, as viewed in the frequency domain.

FIG. 3 is an illustration of SFO, $\varepsilon$, as viewed in the frequency domain. In this case, SFO is represented by the slope in a graph of sub-carrier index versus phase drift. Denote $R_{k,m}$ as the receive (Rx) pilot symbol in the $k_{th}$ sub-carrier of the $m_{th}$, OFDM symbol. Equation 2 defines a relation between the Rx pilot symbols in the $k_{th}$ sub-carrier of the $m_{th}$ and $(m-1)_{th}$ OFDM symbol, $$J_{k,m} = R_{k,m} R^*_{k,m-1} \tag{2}$$

where an asterisk denotes the conjugate.

Normalized SFO can then be represented using Equation 3, where N is the Fast Fourier Transform (FFT) size, G is the Cyclic Prefix (CP) length, k is the sub-carrier index, and $\varepsilon_{k,m}$ is the SFO estimate obtained by the $k_{th}$ sub-carrier, $M_{th}$ OFDM symbol.

$$\varepsilon_{k,m} = \frac{N}{2\pi(N+G)k} \text{angle}(J_{k,m}) \tag{3}$$

In a DVB-H system, k is one of the continual pilot sub-carrier indices. Equation 3 only provides the estimate given by one pilot sub-carrier. In most of the systems, more than one pilot sub-carrier will be available, and we are interested in a final estimate based on a plurality of $\varepsilon_{k,m}$ given by different pilot sub-carriers k. Hence, techniques for combining the $\varepsilon_{k,m}$ for different pilot sub-carriers k are provided below.

There are various techniques currently available to estimate SFO for the symbol over the range of k. Three of those techniques are described herein. The first technique uses a weighted average of $\varepsilon_{k,m}$ based on the Best Linear Unbiased Estimator (BLUE) for time-invariant channels to calculate $\varepsilon_m$ (SFO for the symbol over the range of k). The first technique is represented by Equations 4-6:

$$\varepsilon_m = \sum_{k \in \{Pilot\ Indexes\}} w_{k,m} \varepsilon_{k,m} \tag{4}$$

$$w_{k,m} = \frac{k^2 P_{Rx}}{\sum_{k \in \{Pilot\ Indexes\}} k^2 P_{Rx}} \tag{5}$$

$$\varepsilon_m = \frac{N}{2\pi(N+G)}$$

$$\frac{1}{\sum_{k \in \{Pilot\ Indexes\}} k^2 |J_{k,m}|} \left[ \sum_{k \in \{Pilot\ Indexes\}} k |J_{k,m}| \text{angle}(J_{k,m}) \right],$$

assuming $$P_{Rx} = |J_{k,m}| \tag{6}$$

The second technique employs a vector sum of $J_{k,m}$ over the range of k for Equation 3. The vector sum technique is described herein using Equation 7.

$$\varepsilon_m = \frac{N}{4\pi(N+G)} \frac{1}{\underset{k\in\{Pilot\ Indexes\}}{mean}(|k|)} \left[ angle\left(\sum_{k\in\{+ve\ Pilot\ Indexes\}} J_{k,m}\right) - angle\left(\sum_{k\in\{-ve\ Pilot\ Indexes\}} J_{k,m}\right) \right] \quad (7)$$

Figure 4:
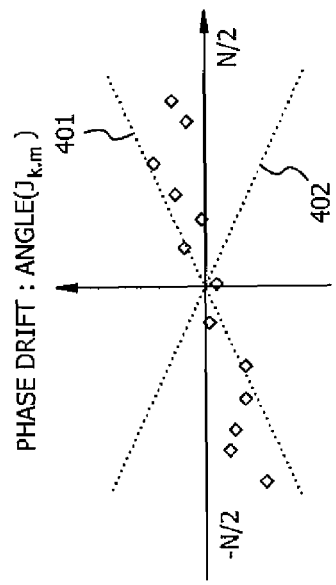
FIG. 4 illustrates two example reference slopes that can be used for computing SFO in some embodiments of the invention.

The third technique is referred to as the "early-late" method. It takes into account two reference slopes, illustrated in FIG. 4 as slopes 401 and 402, respectively. Early-late techniques generally employ Equations 8-10, wherein K is the number of pilot sub-carriers used:

$$F_m^{early} = \frac{1}{K} \sum_{k\in\{Pilot\ Indexes\}} J_{k,m} e^{-j\frac{2\pi k}{N}\delta} \quad (8)$$

$$F_m^{late} = \frac{1}{K} \sum_{k\in\{Pilot\ Indexes\}} J_{k,m} e^{j\frac{2\pi k}{N}\delta} \quad (9)$$

$$\varepsilon_m \sim |F_m^{late}|^2 - |F_m^{early}|^2 \quad (10)$$

Each of the three techniques provides a way to combine the SFO estimated or the phase drift given by each pilot sub-carriers. They can be improved by various embodiments of the present invention. Specifically, it has been discovered that each of the three techniques produces an error in the SFO estimate, $\varepsilon_m$. The correlation of the SFO estimation error in two pilot sub-carriers k and (k+d) can be written as $$E[(\varepsilon_{k,m}-\varepsilon)(\varepsilon_{k+d,m}-\varepsilon)^*], \quad (10a)$$

where d is sub-carrier separation in terms of the number of sub-carriers. If the actual value of the SFO is zero, the correlation will be $$E[\varepsilon_k \varepsilon_{k+d}^*] = \frac{1}{k(k+d)} \left(\frac{N}{2\pi(N+G)}\right)^2 E[angle(J_{k_1,m})angle(J_{k+d,m})] \sim \quad (10b)$$
$$E[angle(J_{k_1,m})angle(J_{k+d,m})]$$

Let $$E = E[angle(J_{k,m})angle(J_{k+d,m})] \quad (11)$$

Figure 5:
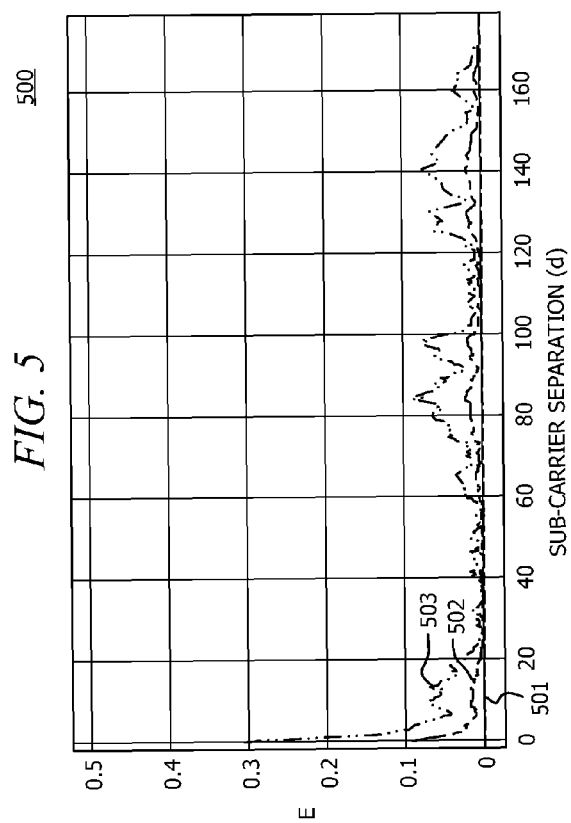
FIG. 5 illustrates graph 500 of correlated error over a range of sub-carrier separation.

FIG. 5 includes graph 500, of E, over a range of sub-carrier separation. In graph 500, correlated error is simulated using term (11).

In graph 500, there is no channel noise, SFO is zero, and the model is based on a DVB signal (2K mode), TU6 channel. Since SFO is zero, the direct proportional relation in equation 10b holds. Line 501 shows correlated error for a Doppler frequency of 10 Hz, which is effectively equivalent to a time-invariant signal. Line 502 shows correlated error for a Doppler frequency of 190 Hz, which indicates a moderate amount of mobility in an OFDM system. Line 503 shows correlated error for a Doppler frequency of 380 Hz, which indicates the highest level of mobility in the DVB-H requirement specified in IEC62002-2. Graph 500 shows, generally, that for a time-varying channel correlated error increases as sub-carrier separation decreases and as Doppler frequency increases. Thus, for error estimation in real-world systems, the channel variation which affects the SFO estimate for one sub-carrier k,m can often affect the SFO estimate of the next sub-carrier k+1,m. In other words, the channel variation in a high pilot density area will generate a similar error effect on a large number of the SFO estimates based on each pilot in that area. The final SFO estimate is obtained by combining the SFO estimates based on each available pilot in an OFDM symbol. In such cases, the error effect in the high pilot density area will be magnified in the final SFO estimates.

Figure 6A:
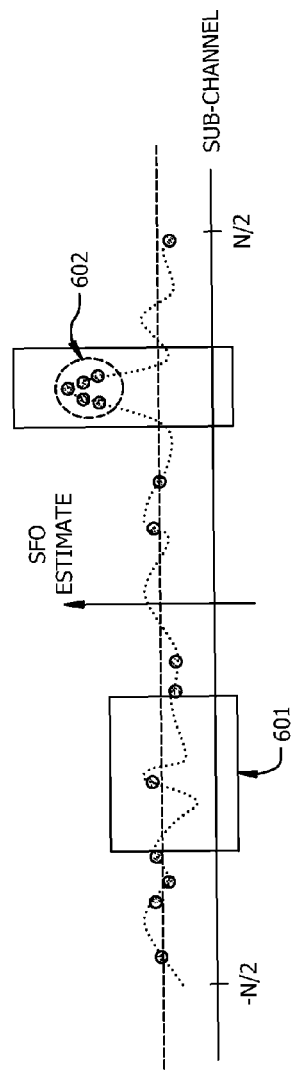
FIGS. 6A and 6B are illustrations of exemplary sets of received pilots that can be handled by various embodiments of the present invention.

FIGS. 6A and B are illustrations of exemplary sets of received pilots, showing both low- and high-density areas. In FIG. 6A, portion 601 is a low-density area, while portion 602 is a high-density area. In the context of continual pilot distributions, a low-density area indicates a frequency region with fewer continual pilot sub-carriers, and a high-density area indicates a frequency region with many continual pilot sub-carriers.

Various embodiments of the present invention include a weighting factor that is based, at least in part, on pilot density. Such weighting factor can be used in each of the above-described three SFO estimation techniques to decrease the weight given to pilots in high pilot density areas, thereby mitigating the compounding effect of SFO estimate error in closely packed pilots. For example, in the scalar average mentioned above, the original weighting factor given in Equation 5 can be modified as in Equation 12.

$$w_{k,m} = \frac{d_k k^2 P_{Rx}}{\sum_{k\in\{Pilot\ Indexes\}} d_k k^2 P_{Rx}} \quad (12)$$

Further, Equation 6 can be modified, as shown in Equation 13.

$$\varepsilon_m = \frac{N}{2\pi(N+G)} \quad (13)$$
$$\frac{1}{\sum_{k\in\{Pilot\ Indexes\}} d_k k^2 |J_{k,m}|} \left[ \sum_{k\in\{Pilot\ Indexes\}} d_k k^2 |J_{k,m}| angle(J_{k,m}) \right]$$

Figure 6B:
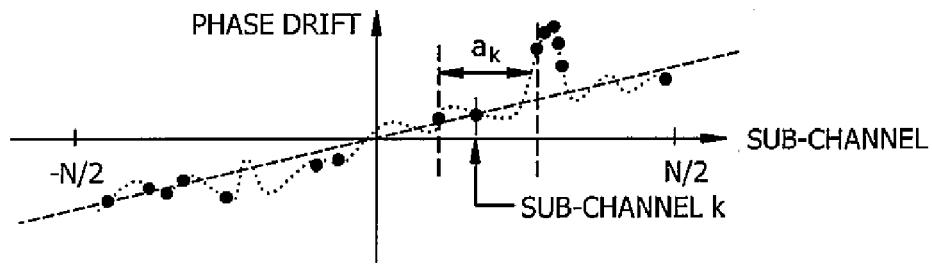

In Equations 12 and 13, $d_k$ is the weighting factor, which is indicative of pilot density. For example, $d_k$ can be defined as $$d_k = \frac{\sqrt{a_k}}{\sum_{k\in\{Pilot\ indexes\}} \sqrt{a_k}}, \quad (14)$$

where $a_k$ is the number of sub-carriers difference between the adjacent continual sub-carriers of the continual pilot index k, as shown in FIG. 6B. Further, $d_k$ is unitless. Equation (14) shows on way to calculate the term, $d_k$, to indicate pilot density. Generally, $d_k$ can be any function in terms of the pilot separation. For example, let C be a set of all the continual pilot sub-carrier indices over the range of k. Then $d_k$ for sub-carrier k can be rewritten as $d_k$=f(k,C). In some embodiments, depending on channel condition, we may set $d_k$ as $$d_k = \frac{a_k}{\sum_{k\in\{Pilot\ indexes\}} a_k} \quad (15)$$

In fact, other ways to calculate $d_k$ can be used that indicate sub-carrier separation or pilot density directly or indirectly.

Equation (16) shows one way to use pilot density in a modified vector sum technique:

$$\varepsilon_m = \frac{N}{4\pi(N+G)} \frac{1}{\underset{k \in \{Pilot\ Indexes\}}{mean}(|k|)} \left[ angle\left( \sum_{k \in \{+ve\ Pilot\ Indexes\}} d_k J_{k,m} \right) - angle\left( \sum_{k \in \{-ve\ Pilot\ Indexes\}} d_k J_{k,m} \right) \right] \quad (16)$$

Equations (17)-(19) show one way to use pilot density in a modified early-late algorithm:

$$F_m^{early} = \frac{1}{K} \sum_{k \in \{Pilot\ Indexes\}} d_k J_{k,m} e^{-j\frac{2\pi k}{N}\delta} \quad (17), (18), (19)$$

$$F_m^{late} = \frac{1}{K} \sum_{k \in \{Pilot\ Indexes\}} d_k J_{k,m} e^{j\frac{2\pi k}{N}\delta}$$

$$\varepsilon_m \sim |F_m^{late}|^2 - |F_m^{early}|^2$$

Simulations of embodiments using $d_k$ have been performed and show positive results. For instance, for DVB (2Kmode), IEC62002-2 requirement (TU6 channel, Doppler frequency of 380 Hz, carrier to noise ratio=12.5 dB) about 10% improvement in terms of root mean square error (RMSE) of the SFO estimate was shown for the scalar average technique when SFO was 50 ppm. Under the same constraints, there was about a 9% improvement in the SFO RMSE for the vector sum technique, and for the early-late technique, there was an improvement of about 2%. While three techniques were shown above, various embodiments are not limited thereto. In fact, any technique now known or later developed that calculates SFO channel-by-channel or pilot-by-pilot can be adapted for use in one or more embodiments.

Figure 7:
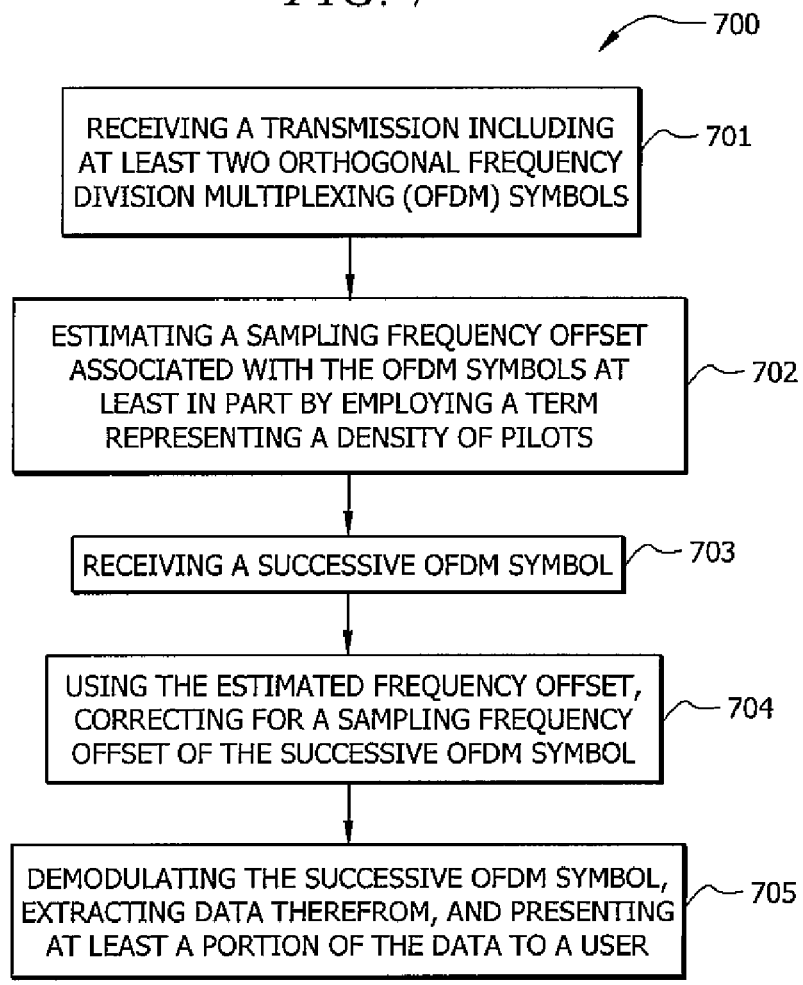
FIG. 7 is an illustration of an exemplary method, adapted according to one embodiment of the invention.

FIG. 7 is an illustration of exemplary method 700, adapted according to one embodiment of the invention. Method 700 may be performed by any of a variety of systems, such as those shown in FIGS. 1, 8, and 9. In step 701, a transmission is received that includes at least two OFDM symbols. In many instances, there may be a frequency offset between the transmitting and the sampling, such that SFO exists.

In step 702, an SFO is estimated for at least one of the OFDM symbols. Such estimation is performed at least in part by employing a term representing a density of pilots in the OFDM symbols. For example, various embodiments use the term $d_k$, described above. Step 702 can be performed using a variety of techniques, such as a scalar average technique, a vector sum technique, an early-late technique, and/or one or more other techniques. As mentioned above, the SFO estimation in step 702 compensates, at least partly, for correlated errors in high pilot density areas.

In step 703, another OFDM symbol is received. In step 704, the estimated SFO that was calculated in step 702 is used to correct for SFO in the later-received OFDM symbol. For example, a resampling operation can be performed to compensate for the SFO. In step 705, the later-received OFDM symbol is demodulated and data is extracted from it. At least a portion of the data is presented to a user by, for example, a screen on a handheld device or personal computer and/or speakers on a handheld device or personal computer.

While the above-described embodiment uses SFO estimates to correct for SFO in later-received symbols, various embodiments of the invention are not so limited. If the OFDM symbols that are used for the SFO estimation are buffered, then it is possible to apply the SFO estimate to perform SFO correction on those symbols themselves. The data is then extracted from the corrected symbols. Such an embodiment can be included in, e.g., a digital TV demodulator or other buffered application.

Method 700 may further include computing the pilot density before or during step 702. In systems that have continual pilot patterns, pilot density can be known quite quickly, even from as few as one observed OFDM symbol. In a DVB-H embodiment, the pilot pattern (i.e., the set of the continual pilot indices) is fixed. If the pilot pattern is changed, the pilot density is re-computed. However, this will generally not occur in fixed pattern systems, such as those that use DVB-H.

While method 700 is shown as a series of discrete steps, it should be noted that various embodiments of the invention are not so limited. In fact, some embodiments may add, delete, modify, and/or rearrange steps. For instance, various embodiments repeat the steps of method 700 as OFDM symbols are received.

Figure 8:
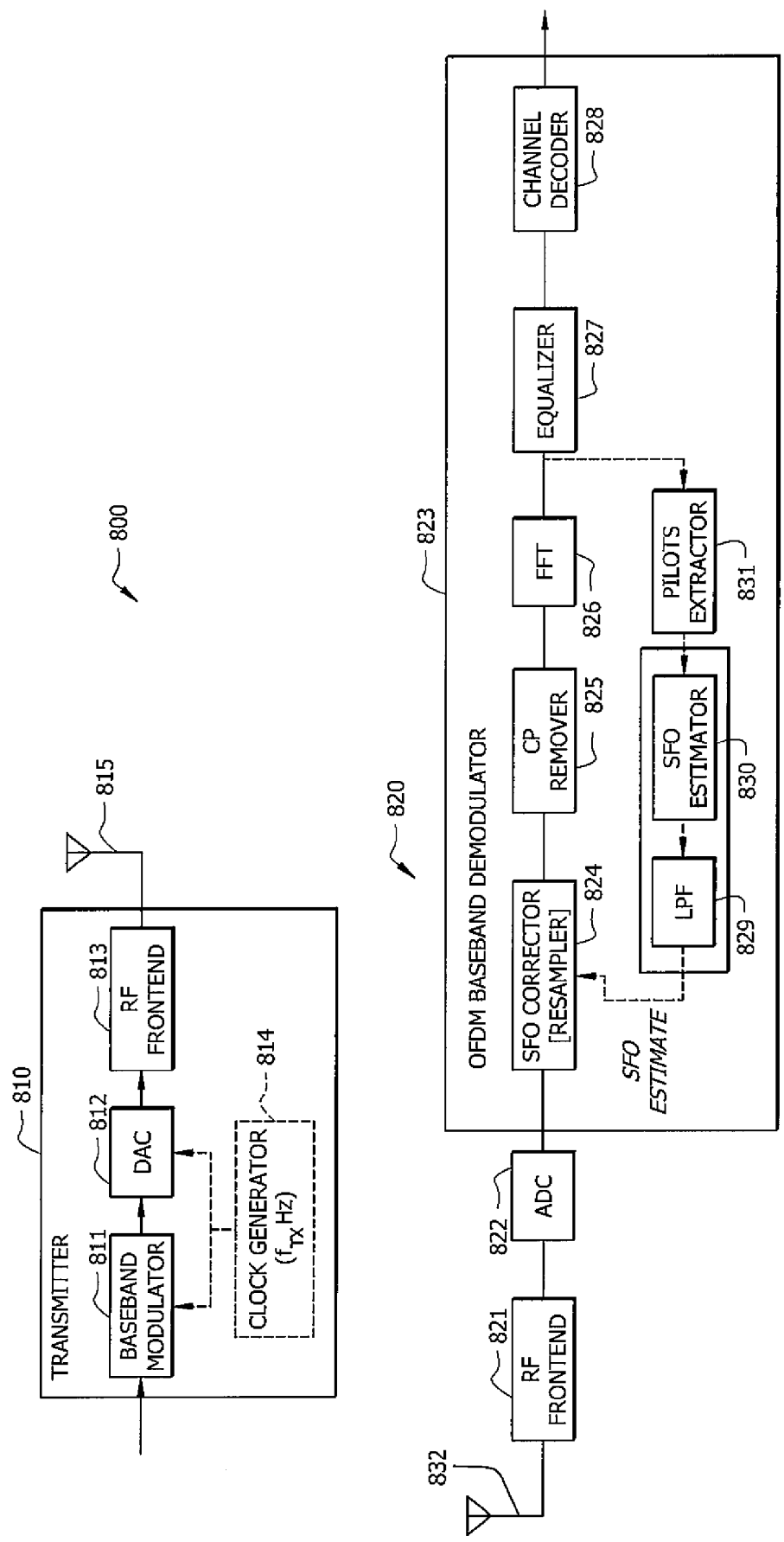
FIG. 8 is an illustration of an exemplary system adapted according to one embodiment of the invention.

FIG. 8 is an illustration of exemplary system 800 adapted according to one embodiment of the invention. System 800 is an exemplary system for transmitting and receiving data using OFDM techniques. System 800 can be adapted into a variety of specific applications, including applications for radio/television broadcast, data voice communication in a wireless telephone network, data communication using WIMAX or WIFI, and/or the like. Examples of applications of embodiments of the invention include, e.g., wireless Local Area Networks (LANs) and Metropolitan Area Networks (MANs), Digital Video Broadcasting-Television (DVB-T), Coded OFDM (COFDM), Multiband-OFDM (MB-OFDM) in Ultra Wideband (UWB) technology, 4G handheld technology, Third Generation Partnership Project's (3GPP) Long term Evolution (LTE), Integrated Services Digital Broadcasting (ISDB), and/or the like. In fact, principles of the invention can be applied to wired OFDM networks too, such as Asymmetric Digital Subscriber Line (ADSL) systems.

System 800 includes transmitter 810 and receiver 820. Various embodiments of the invention may be adapted for use with known OFDM transmitters, requiring no change to OFDM transmitters. Accordingly, transmitter 810, in this embodiment, can be any OFDM transmitter now known or later developed. Transmitter 810 includes baseband modulator 811 and Digital to Analog Converter (DAC) 812, each controlled by clock 814, set at $f_{Tx}$. Radio Frequency (RF) frontend 813 receives the data from DAC 812 and transmits the data using antenna 815.

In the example shown in FIG. 8, the steps of method 700 are performed by receiver 820. Receiver 820 receives the data from transmitter 810 via antenna 832, RF frontend 821, and Analog to Digital Converter (ADC) 822. The digital data from ADC 822 is received by baseband demodulator 823.

Demodulator 823 has a feedback loop for correcting for SFO. The feedback loop includes SFO corrector 824, CP remover 825, FFT module 826, pilot extractor 831, SFO estimator 830, and Low Pass Filter 829. SFO estimator 830 estimates SFO, as explained in detail above, and SFO corrector 824 uses the estimated SFO from estimator 830 to correct for SFO in subsequently received symbols. After FFT has been performed on the received data, the data is sent to equalizer 827 and to channel decoder 828. SFO estimator 830 estimates the residual SFO error after SFO correct 824 provides correction to the signal. Since the SFO error is smaller after the correction, this can improve the performance of the SFO estimate by reducing the ICI in the frequency domain signals caused by the SFO. However, various embodiments are not limited to the configuration shown in FIG. 8. For Example, SFO estimator 830 can use the uncorrected signal directly.

Embodiments of the present invention may provide one or more advantages over prior art systems. As mentioned above, some embodiments show lower error in SFO estimates versus prior art systems that use unmodified SFO estimation techniques (e.g., scalar average, vector sum, early-late). Further, many embodiments can be implemented with little added complexity/cost to current systems. For instance, many embodiments can work with current transmitters, thereby eliminating cost of replacing/upgrading transmitters. In many instances, applying the inventive technology is as simple as upgrading software/firmware or replacing a chip in an existing device.

When implemented via computer-executable instructions, various elements of embodiments of the present invention are in essence the software code defining the operations of such various elements. The executable instructions or software code may be obtained from a readable medium (e.g., a hard drive media, optical media, RAM, EPROM, EEPROM, tape media, cartridge media, flash memory, ROM, memory stick, and/or the like). In fact, readable media can include any medium that can store information.

Figure 9:
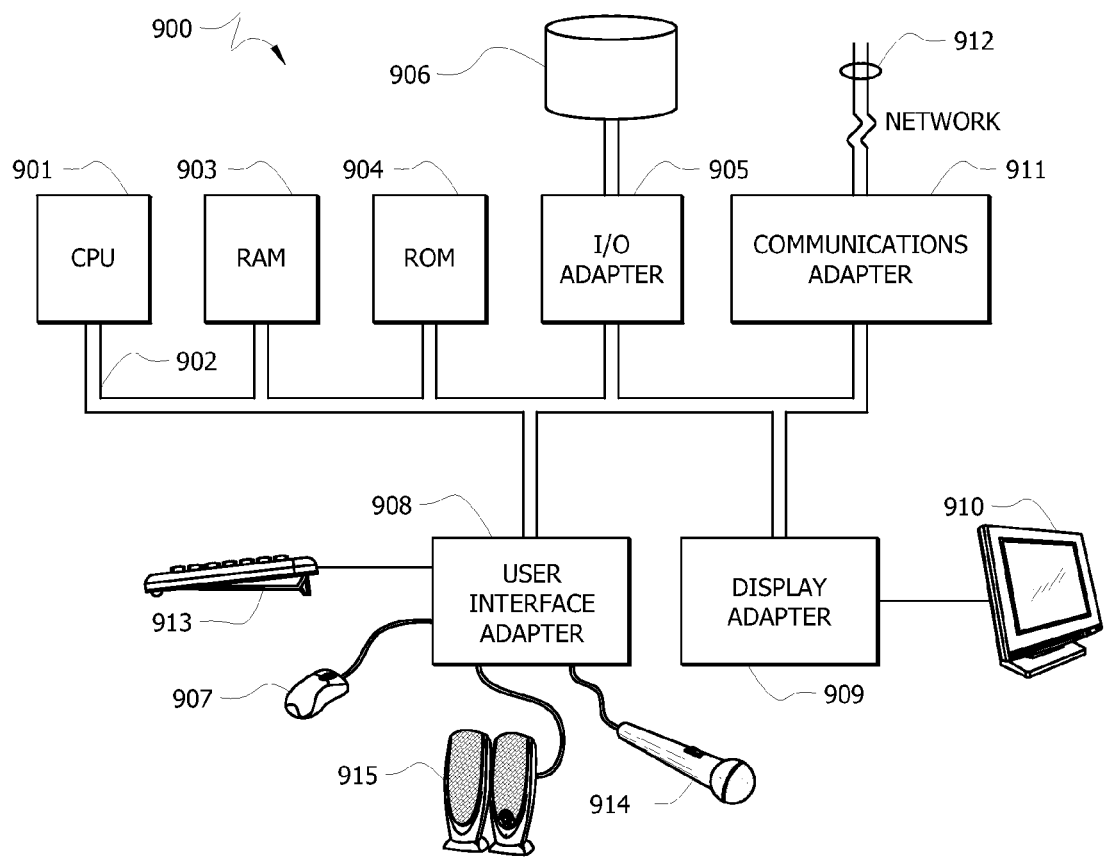
FIG. 9 illustrates an example computer system adapted according to embodiments of the present invention.

FIG. 9 illustrates an example computer system 900 adapted according to embodiments of the present invention. That is, computer system 900 comprises an example system on which embodiments of the present invention may be implemented (such as system 100 of FIG. 1). Central processing unit (CPU) 901 is coupled to system bus 902. CPU 901 may be any general purpose CPU. However, the present invention is not restricted by the architecture of CPU 901 as long as CPU 901 supports the inventive operations as described herein. CPU 901 executes the various logical instructions according to embodiments of the present invention. For example, one or more CPUs, such as CPU 901, may execute machine-level instructions according to the exemplary operational flows described above in conjunction with FIG. 7.

Computer system 900 also preferably includes random access memory (RAM) 903, which may be SRAM, DRAM, SDRAM, or the like. Computer system 900 preferably includes read-only memory (ROM) 904 which may be PROM, EPROM, EEPROM, or the like. RAM 903 and ROM 904 hold user and system data and programs, as is well known in the art.

Computer system 900 also preferably includes input/output (I/O) adapter 905, communications adapter 911, user interface adapter 908, and display adapter 909. I/O adapter 905, user interface adapter 908, and/or communications adapter 911 may, in certain embodiments, enable a user to interact with computer system 900 in order to input information, such as Universal Resource Locators (URLs) that lead to network content.

I/O adapter 905 preferably connects to storage device(s) 906, such as one or more of hard drive, compact disc (CD) drive, floppy disk drive, tape drive, etc., to computer system 900. The storage devices may be utilized when RAM 903 is insufficient for the memory requirements associated with storing media data. Communications adapter 911 is preferably adapted to couple computer system 900 to network 912 (e.g., the Internet, a LAN, a cellular network, a wireless data network, e.g., WIFI, WIMAX, etc.). In some embodiments, communications adaptor 911 includes some or all of the components shown in system 800 of FIG. 8. User interface adapter 908 couples user input devices, such as keyboard 913, pointing device 907, and microphone 914 and/or output devices, such as speaker(s) 915 to computer system 900.

Display adapter 909 is driven by CPU 901 to control the display on display device 910 to, for example, display received content.

While FIG. 9 shows a general-purpose computer, it should be noted that the exact configuration of a portion of a system according to various embodiments may be slightly different. For example, receivers according to one or more embodiments may be any kind of processor-based device, such as a cell phone, a Personal Digital Assistant, a television tuner, a Set Top Box (STB) for a television, a wireless base LAN/MAN base station, and/or the like. Further, various embodiments can implement the functionality described above in specialized hardware modules or as software modules that are executed on processor-based devices. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
receiving a transmission including at least two Orthogonal Frequency Division Multiplexing (OFDM) symbols;
estimating a sampling frequency offset associated with said OFDM symbols at least in part by employing a term representing a density of pilots in said OFDM symbols; and
compensating for said sampling frequency offset using said estimated sampling frequency offset.

2. The method of claim 1 wherein said estimating includes a scalar average algorithm.

3. The method of claim 1 wherein said estimating includes a vector sum algorithm.

4. The method of claim 1 wherein said estimating includes an early-late algorithm.

5. The method of claim 1 further comprising:
demodulating said received OFDM symbols, extracting data therefrom, and presenting at least a portion of said data to a user.

6. The method of claim 1 wherein said method is implemented in a system utilizing pilot sub-carriers distributed non-uniformly in a frequency domain, and wherein said method further comprises:
pre-computing said density of pilots based on a pattern of said pilots within said OFDM symbols.

7. The method of claim 1 further comprising:
receiving a successive OFDM symbol; and
using said estimated sampling frequency offset, correcting for a sampling frequency offset of said successive OFDM symbol.

8. The method of claim 1, wherein said compensating comprises:
buffering said received symbols; and
correcting said symbols for said sampling frequency offset.

9. The method of claim 1 wherein said estimating comprises:
calculating within said OFDM symbols a probable value for said sampling frequency offset in a sub-carrier by sub-carrier manner.

10. A system comprising:
circuitry processing received Orthogonal Frequency Division Multiplexing (OFDM) symbols, said circuitry including:
a sampling frequency offset estimator calculating a sampling frequency offset for at least one of said received OFDM symbols using an algorithm that weights sub-carrier offset values based at least in part on pilot density; and
a sampling frequency offset corrector using said calculated sampling frequency offset to correct for a sampling frequency offset.

11. The system of claim 10 wherein said sampling frequency offset corrector compensates for a sampling frequency offset in a subsequently received OFDM symbol using said calculated sampling frequency offset.

12. The system of claim 10 wherein said sampling frequency offset corrector uses said calculated sampling frequency offset to correct for a sampling frequency offset in said at least one of said received OFDM symbols.

13. The system of claim 10 further comprising:
circuitry demodulating said received OFDM symbols, extracting data therefrom, and presenting at least a portion of said data to a user.

14. The system of claim 10 wherein said sampling frequency offset estimator employs a scalar average algorithm.

15. The system of claim 10 wherein said sampling frequency offset estimator employs a vector sum algorithm.

16. The system of claim 10 wherein said sampling frequency offset estimator employs an early-late algorithm.

17. The system of claim 10 using pilot sub-carriers distributed non-uniformly in a frequency domain, and wherein said sampling frequency offset estimator pre-computes said density of pilots based on a pattern of said pilots within said OFDM symbols.

18. A computer program product having a non-transitory computer readable medium having computer program logic recorded thereon, said computer program product comprising:
code, when executed by a computer, receiving information regarding pilots in received Orthogonal Frequency Division Multiplexing (OFDM) symbols;
code, when executed by a computer, using said received information to estimate a sampling frequency offset of said OFDM symbols, said estimating including weighting frequency offset values for sub-carriers based at least in part on pilot density; and
code, when executed by a computer, using said estimated sampling frequency offset to correct for a sampling frequency offset.

19. The computer program product of claim 18 wherein said sampling frequency offset is corrected in a subsequently received OFDM symbol.

20. The computer program product of claim 18 wherein said pilots are distributed non-uniformly in a frequency domain, and wherein said computer program product further comprises:
code for pre-computing said density of pilots based on a pattern of said pilots within said OFDM symbols.

* * * * *

UNITED STATES PATENT AND TRADEMARK OFFICE
CERTIFICATE OF CORRECTION

PATENT NO. : 8,085,860 B2  Page 1 of 1
APPLICATION NO. : 12/111779
DATED : December 27, 2011
INVENTOR(S) : Kwan et al.

It is certified that error appears in the above-identified patent and that said Letters Patent is hereby corrected as shown below:

In the Specification:

Column 6, Equation 13, Lines 38-40, delete that portion of the equation reading

" $\left[\sum_{k \in \{\text{Pilot Indexes}\}} d_k k^2 |J_{k,m}| angle(J_{k,m})\right]$ " and replace with -- $\left[\sum_{k \in \{\text{Pilot Indexes}\}} d_k k |J_{k,m}| angle(J_{k,m})\right]$ --.

Signed and Sealed this
Thirty-first Day of January, 2012

David J. Kappos
*Director of the United States Patent and Trademark Office*